United States Patent [19]

Krofta

[11] 4,184,967

[45] Jan. 22, 1980

[54] APPARATUS FOR CLARIFYING WASTE WATER

[75] Inventor: Milos Krofta, Lenox, Mass.

[73] Assignee: Lenox Institute for Research, Inc., Lenox, Mass.

[21] Appl. No.: 917,954

[22] Filed: Jun. 22, 1978

[51] Int. Cl.² .............................................. B03D 3/00
[52] U.S. Cl. ................................... 210/525; 209/168; 209/492
[58] Field of Search .................. 210/195 R, 520, 525, 210/44, 221 R; 209/168, 492

[56] References Cited

U.S. PATENT DOCUMENTS

| 3,307,701 | 3/1967 | Krofta | 210/195 R |
| 4,022,696 | 5/1977 | Krofta | 210/520 |
| 4,035,288 | 7/1977 | Gibert et al. | 209/486 |

FOREIGN PATENT DOCUMENTS 568681 7/1958 Belgium ................................. 209/492

Primary Examiner—Frank Sever
Attorney, Agent, or Firm—Edward T. Connors

[57] ABSTRACT

Apparatus for clarifying treated waste water in which the waste water is floated and settled in a flotation tank equipped with a rotatable carriage provided with multi-scoop means. The multi-scoop means is rotated as it is passed through the upper strata of the treated waste water for the removal of floated particles or sludge with no appreciable disturbance of the main body of waste water. The multi-scoop carries the floated particles or sludge to a sludge outlet in an efficient manner without clogging by an unique construction self-cleaning in operation.

4 Claims, 9 Drawing Figures

APPARATUS FOR CLARIFYING WASTE WATER

BACKGROUND OF THE INVENTION

Among known methods in the waste water clarification art a few percent of air by volume is dissolved into waste water in which the water is under pressure of between 30–100 pounds per square inch. As the water is released into a flotation tank microscopic air bubbles emerge and attach themselves to particles suspended in the water so as to float the particles to the surface. The waste water may be treated with flocculating chemicals so that the particles are flocculated. The use of the flocculating chemicals and the dissolved air results in a rapid-flotation rate and a more compete separation of the suspended particles from the waste water.

The present invention relates to an apparatus for the removal of the floatable solids effected by the flotation process.

DESCRIPTION OF THE PRIOR ART

Apparatus has heretofore been provided for the removal of the floated solid particles from waste water among which is the apparatus shown in U.S. Pat. No. 3,307,701 issued Mar. 7, 1967 to Milos Krofta, the applicant herein. This patent discloses an improved spirally curved skimmer plate engaging the surface of a body of treated waste water so as to scoop off the floated material.

Still another apparatus for separating solids is shown in U.S. Pat. No. 4,022,696 issued May 10, 1977 to Milos Krofta, the applicant herein. This apparatus provides an improved construction for clarifying the waste water with a minimum amount of turbulence by utilizing a simple and compact structure in which a carriage is provided incorporating the scoop of U.S. Pat. No. 3,307,701 together with a distribution pipe system for introducing the treated water into the flotation tank in which a carriage carries both an inlet pipe for the waste water and an outlet pipe for clarified water. The carriage is carried between the upper edge of the flotation tank and central supporting means.

As taught in Krofta U.S. Pat. No. 4,022,696 it has been found that the sedimentation velocity of particles is approximately at the rate of one inch per minute, resulting in a clarification rate of 0.5 gallon per minute per square foot of sedimentation area. For flotation, a rising velocity of approximately 12 inches per minute results in a clarification rate of 7½ gallons per minute per square foot of flotation. However, prior commercial clarifiers operating on this principle generally clarify only at an average rate of 2 gallons per square foot of flotation area or at only about one quarter of the theoretical rate.

In accordance with the teaching of Krofta U.S. Pat. No. 4,022,696, by utilizing improved apparatus causing a minimum amount of turbulence and by providing a longer path for the upward flow of the dissolved particles, the clarification load is improved to 4 to 6 gallons per minute per square foot of area. This result is accomplished using tanks in which the depth of water being treated is only about one third of the depth of conventional systems. Thus it is known to provide a satisfactory method of introducing the treated waste water into a tank of economical size and producing a floatable sludge in an expeditious manner. In fact, the flotation rate achieved has been very satisfactory, but the rate of removal of the floated material has not been as adequate as is desireable.

SUMMARY OF THE INVENTION

The present invention aims to overcome the difficulties and disadvantages of prior constructions by providing an improved apparatus for clarifying waste water utilizing the flotation principle in which a more rapid recovery of floatables is achieved.

In accordance with the invention there is provided an improved apparatus for clarifying waste water in which a minimum amount of turbulence is caused in the water being clarified. Thus effective results are achieved using a simple and compact structure with a high recovery rate.

The improved structure results in a clarification load of more than double that achieved by the Krofta prior art structures which as stated before was a considerable improvement over the earlier art. The improved result is achieved by utilizing a multi-blade scoop so that the floatables on the surface of the water are almost continuously removed as the collection arm is moved over the water's surface. This structure at first glance seems simple in conception until consideration is given to the movement of the collected sludge from the point of collection in the scoop. It should be quite obvious that maximum efficiency is achieved by incorporating a minimum amount of water with the floated material. However, by incorporating less water it is difficult to move the sludge to a collection outlet. The structure in accordance with the invention not only provides a slowly moving skimmer resulting in less disturbance of the treated water at the point of contact between the skimmer and the water but permits a faster movement of the carriage arm as it swings across the top surface of the floatation tank. The structure provides for an increased flow rate of the sludge towards the sludge removal outlet.

Other objects and advantages of the invention will be apparent from the following description and from the accompanying drawings which show, by way of example, an embodiment of the invention.

DESCRIPTION OF THE PREFERRED EMBODIMENT

Figure 1:
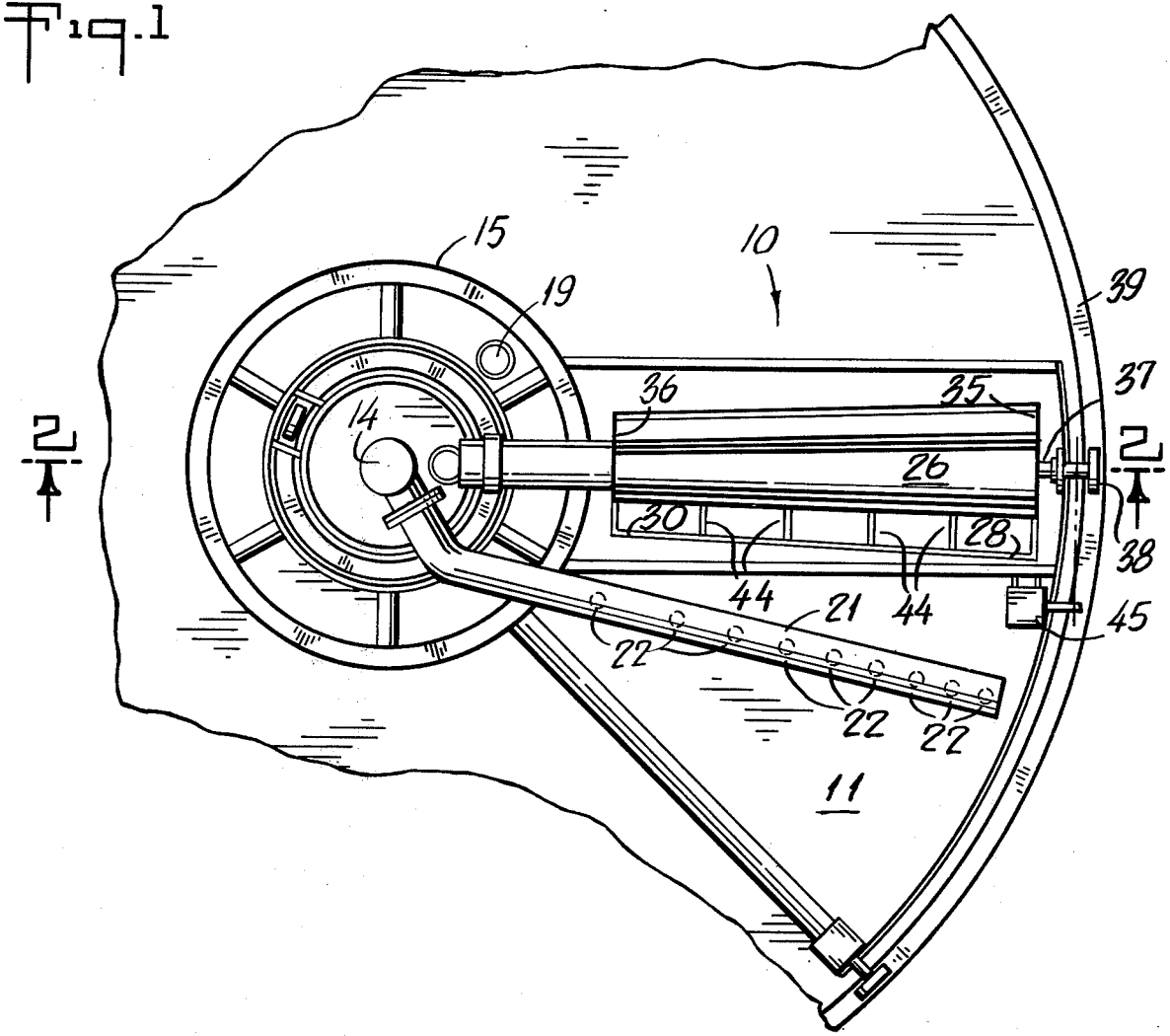
FIG. 1 is a fragmentary top view of an apparatus in accordance with the invention.
Figure 2:
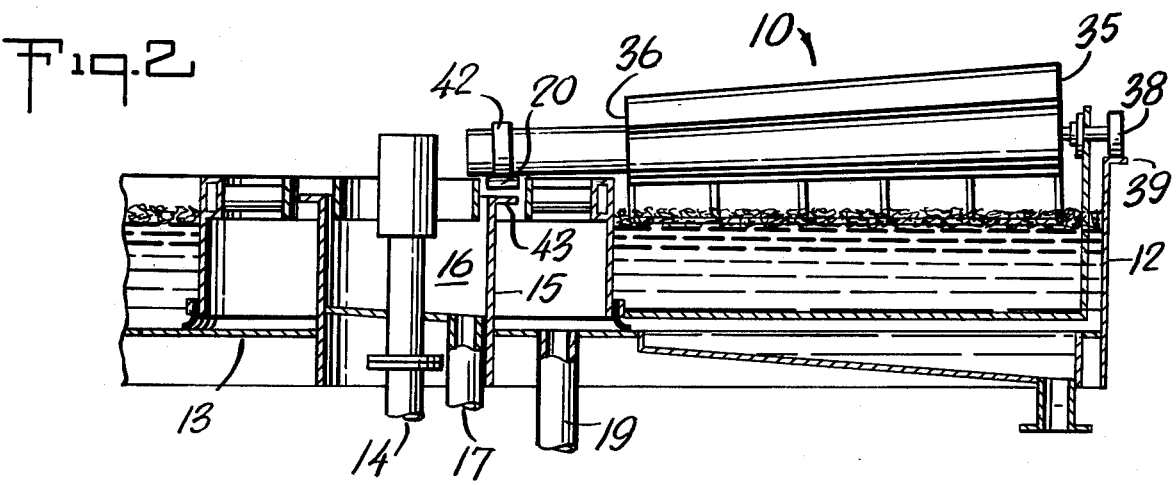
FIG. 2 is a sectional side view corresponding to FIG. 1.

Referring to the drawings there is shown in FIGS. 1 and 2 apparatus 10 for purifying unclarified waste water in the paper, pulp, and like industries in which solids are removed by means of air flotation and sedimentation, approximately 90 percent of the solids being removed by flotation. The apparatus 10 includes a cylindrically shaped tank 11 having an upwardly directed wall 12 and a generally flat bottom 13. An inlet pipe 14 extends vertically to the center portion of the tank. An upwardly directed circular wall 15 defines a sludge or floated solids compartment 16 positioned about the inlet pipe 14. An outlet pipe 17 is provided at the bottom of the sludge compartment 16. An outlet 19 for clarified water is formed in the bottom of the tank outwardly of the sludge compartment 16. A carriage or inner supporting means 20 carries an inlet fluid distribution pipe 21 fitted with downwardly extending perforated pipes 22 together with the inner end of the multi-scoop assembly 25.

The details of a suitable turbulence free construction of the entry pipe for the incoming unclarified waste water may be seen by referring to Milos Krofta U.S. Pat. No. 4,022,696, or other suitable constructions known in the art may be used.

Figure 7:
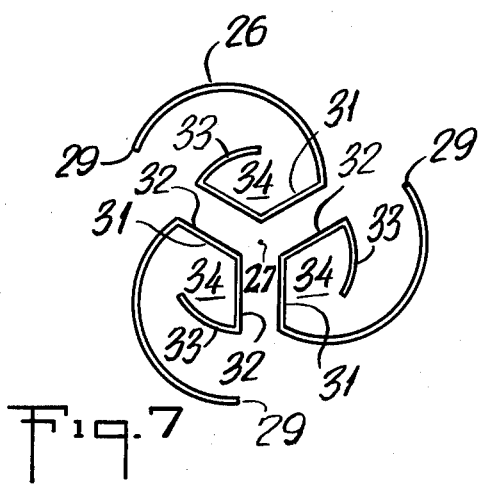
FIG. 7 is a sectional view of the multi-scoop assembly of FIG. 5 taken along the line 7—7 and looking in the direction in which the arrows are pointed. However, for the purpose of clarity in this view of the scoop blades are shown separated at their inner ends.
Figure 9:
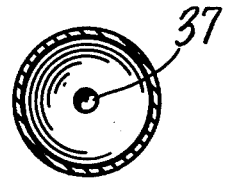
FIG. 9 is a sectional view of the multi-scoop assembly of FIG. 5 taken along the line 9—9 and looking in the direction in which the arrows are pointed.

The multi-scoop assembly 25 is preferably formed of a plurality of blades 26, as shown in sectional view in FIG. 7. In FIG. 7 the blades 26 are shown spaced from each other about a center point 27 with approximate angles between the turned in portions of about 120 degrees. In assembly the blades 26 may be brought together and secured by welding or other appropriate construction. The outer ends 28 of lips 29 of blades 26 (FIG. 1) are longer than the inner ends 30 so that when the assembly is constructed with its axis through center point 27 (FIG. 7) positioned at an angle sloping from the outer edge of the tank towards the center portion thereof the lip edge 28-30 will be substantially horizontal for engagement beneath the surface of the water at the same level along the length of the multi-scoop assembly 25.

At their inner edges, the scoop blades 26 (FIG. 7) are turned inwardly as indicated at 31, and again at 32 and 33, thereby providing a passage space 34. While the blades 26 have been shown as formed of a single piece of material with longitudinal ends it is obvious that each blade may be constructed of a plurality of sections welded together.

At the end of the blades 26 are attached end plates 35 and 36 (FIGS. 1 and 2). End plate 35 may have a flared shaft 37 fitted with a bearing wheel 38 adapted to rotate on a track 39 powered by a motor 45 carried by the carriage 20 and positioned above the upper end of the tank wall 12.

Figure 3:
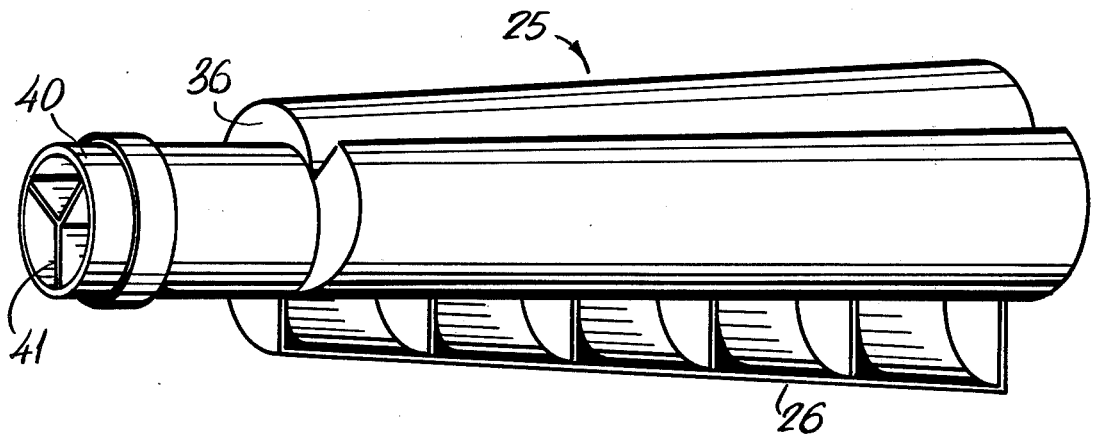
FIG. 3 is a perspective view at an enlarged scale showing the multi-scoop assembly.
Figure 6:
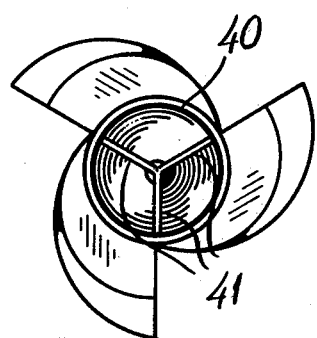
FIG. 6 is an end view of the multi-scoop assembly of FIG. 5 taken along the line 6—6 and looking in the direction in which the arrows are pointed.
Figure 8:
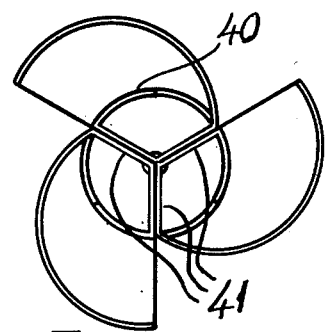
FIG. 8 is a sectional view of the multi-scoop assembly of FIG. 5 taken along the line 8—8 and looking in the direction in which the arrows are pointed.

End plate 36 (FIGS. 3 and 6) is apertured and fitted with a discharge pipe 40 which is preferably fitted with a plurality of baffle members 41 positioned so as to separate the flow of sludge collected from each of the blades 26. A bearing member 42 (FIG. 2) is adapted to engage a track 43 on the top edge of the wall 15. If desired a plurality of spaced tangentially extending stiffening members 44 may be provided for the reenforcement of the outer edges or lips of the scoop blades 26.

Figure 4:
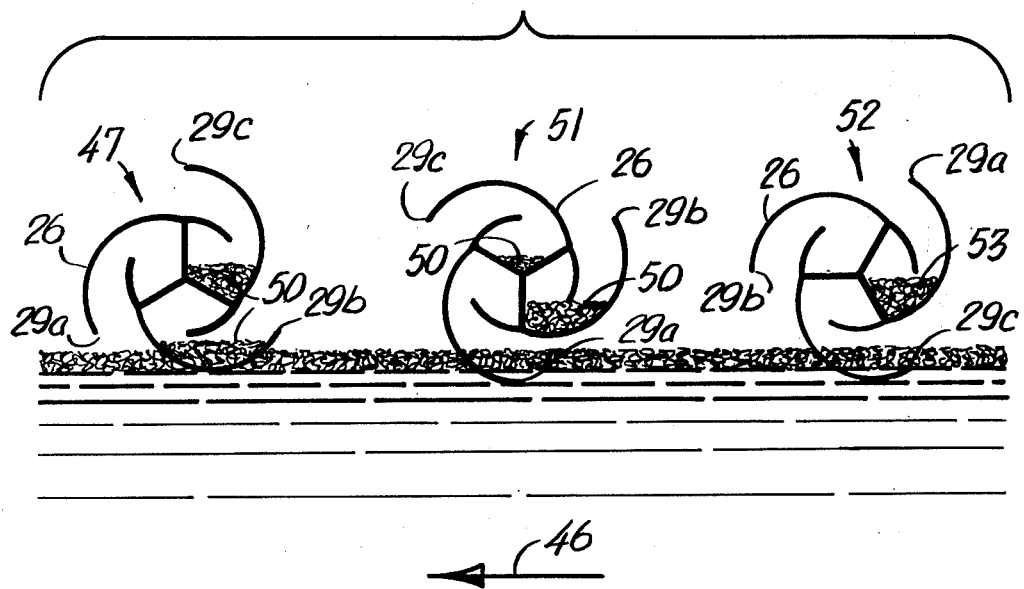
FIG. 4 shows a series of sectional views of the multi-scoop assembly as it passes through the upper surface of treated waste water illustrating how the collected sludge is raised so as to flow by gravity through the scoop assembly to the sludge discharge outlet.
Figure 5:
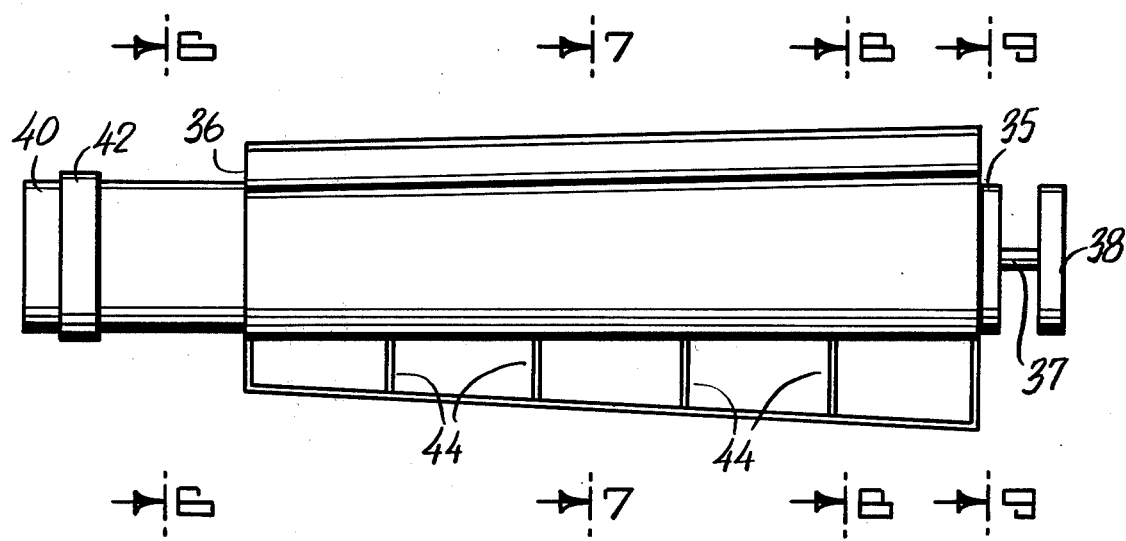
FIG. 5 is a side view of the scoop assembly providing sectional points for later views.

In the operation of the waste water clarifying apparatus 10 unclarified waste water is supplied through inlet pipe 14, through inlet fluid distributing pipe 21, and through downwardly extending perforated pipes 22 into the tank 11. Motor 45 rotates the multiscoop 25 and carries with it the distribution pipe 21 so that inlet fluid is continually distributed into the tank. Referring to FIG. 4 there is shown a plurality of views of the multiscoop 25 indicated by the numerals 47, 51, and 52 as it moves over the surface of the slurry in the direction of arrow 46. In the position indicated by the numeral 47 scoop lip 29a is about to enter sludge 48 floating on the surface of slurry 49. At this time scoop lip 29b has already passed through and collected sludge indicated at 50. In the position indicated by the numeral 51 scoop lip 29a has entered sludge 48 and scoop lip 29b has moved upwardly carrying with it sludge 50 which is being discharged through its corresponding space between the baffle members 41 into the sludge compartment 16 (FIG. 2).

In the position indicated by the numeral 52 the scoop lip 29b has passed over the top of its travel and sludge 50 has been completely discharged. The scoop lip 29a has lifted and is discharging its load of sludge 53. In like fashion the scoop 29c picks up and discharges its load of sludge. It should be noted that the construction providing a separate flow path for the loads collected by each of the scoops 29a, 29b and 29c results in an almost continuous flow of sludge into the sludge compartment 16 as differing from the flow from a single scoop. It has been found that difficulty has been has using a single scoop enlarged in size in that the flow rate pulsates from maximum to minimum and thus it is impossible to get the desired flow away from the scoop using a single blade. Of course, the same difficulty would be presented using a plurality of scoops feeding a single discharge path.

In a commercial embodiment of the invention, the apparatus is provided with tanks of various sized diameters ranging from 8 to 44 feet. The depth of the waste water in the tanks is generally from 16 to 18 inches. Such tanks are suitable fortreating from 148 gallons per minute to 4500 gallons per minute. The outflow purity of the clarified water ranges from 10 to 100 parts per million. The horsepower required for the operation of the apparatus is of the order of 0.57 kilowatt hour per 1000 gallons. The retention time of the water in the tanks is of the order of 2½ minutes. The weight of the apparatus is of the order of 150 pounds per square foot, and the specific clarification load is of the order of 4 to 6 gallons per minute of square foot area.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:
1. Apparatus for purifying unclarified water in the paper, pulp, and like industries comprising,
a cylindrically shaped tank open at its upper end,
unclarified water inlet means for said tank,
clarified water outlet means for said tank,
sludge outlet means for said tank located centrally thereof, scoop supporting means positioned radially of said tank at its open end, means for rotatable movement of said scoop supporting means around the upper surface of said tank, means for axial rotation of said scoop supporting means, a scoop assembly including more than two substantially equally spaced scoop blades radially positioned about a center line and carried by said scoop supporting means at an angle sloping from the outer edge of said tank towards the center portion thereof, said scoop blades extending radially substantially from the outer edge of said tank towards the center portion thereof, the blades of said scoops extending further from said center line in the direction towards the edge of said tank thereby providing substantially horizontal lip edges for engagement of sludge floating on unclarified water in said tank, end face plates being provided for said scoop blades, and bearing means being provided at each end thereof to carry the scoop assembly in said supporting means, an axially extending deflecting member being provided and being attached along at least a portion of said turned-in portion each scoop blade on the back side thereof, a tubular member being provided and attached to said end face plate at the center portion of said tank leading to said sludge outlet means, and baffle means being provided for said tubular member for each scoop blade dividing said tubular member axially, said axially extending deflecting members and baffle means cooperating to provide more than two trough means which function to feed said sludge from said tank substantially continuously through said tubular thereby substantially reducing the possibility of clogging thereof.

2. Apparatus according to claim 1 in which said inner edges of said scoop blades are turned-in providing approximate angles between the turned-in portions of about 120 degrees.

3. Apparatus according to claim 2 in which the turned in portions of said scoop blades are welded together longitudinally thereby providing greater rigidity to the assembly.

4. Apparatus according to claim 2 in which a plurality of spaced tangentially extending stiffening members are provided for each of said scoop blades.

* * * * *